US008663730B1

(12) United States Patent
Lahiri et al.

(10) Patent No.: US 8,663,730 B1
(45) Date of Patent: Mar. 4, 2014

(54) METHOD TO FABRICATE A THREE DIMENSIONAL BATTERY WITH A POROUS DIELECTRIC SEPARATOR

(75) Inventors: Ashok Lahiri, Cupertino, CA (US); Murali Ramasubramanian, Fremont, CA (US); Robert Spotnitz, Pleasanton, CA (US)

(73) Assignee: Enovix Corporation, Fremont, CA (US)

( * ) Notice: Subject to any disclaimer, the term of this patent is extended or adjusted under 35 U.S.C. 154(b) by 469 days.

(21) Appl. No.: 12/013,398

(22) Filed: Jan. 11, 2008

Related U.S. Application Data

(60) Provisional application No. 60/884,846, filed on Jan. 12, 2007, provisional application No. 60/884,828, filed on Jan. 12, 2007.

(51) Int. Cl.
*H01M 2/14* (2006.01)
*H01M 2/00* (2006.01)

(52) U.S. Cl.
USPC ......... 427/126.1; 427/58; 427/79; 427/126.3; 427/126.4; 204/450; 204/471; 204/483; 204/484; 204/489; 204/490

(58) Field of Classification Search
USPC ........................................................ 427/58
See application file for complete search history.

(56) References Cited

U.S. PATENT DOCUMENTS

| | | | |
|---|---|---|---|
| 4,376,031 A * | 3/1983 | Andrus et al. ................ 204/622 |
| 4,496,640 A * | 1/1985 | Kobayashi et al. ........... 429/213 |
| 4,820,599 A | 4/1989 | Furukawa et al. |
| 4,996,129 A | 2/1991 | Tuck |
| 5,294,504 A * | 3/1994 | Otagawa et al. .............. 429/213 |
| 5,322,300 A * | 6/1994 | Mistrater et al. ............. 279/2.17 |
| 5,939,206 A * | 8/1999 | Kneezel et al. .............. 428/480 |
| 5,993,990 A | 11/1999 | Kanto et al. |
| 6,143,673 A * | 11/2000 | Jang et al. ..................... 438/790 |
| 6,432,585 B1 | 8/2002 | Kawakami |
| 6,498,406 B1 | 12/2002 | Horiuchi |
| 6,645,675 B1 * | 11/2003 | Munshi ......................... 429/305 |
| 6,878,173 B2 | 4/2005 | Miyahisa |
| 7,153,609 B2 | 12/2006 | Kubo et al. |
| 7,662,265 B2 | 2/2010 | Chiang et al. |
| 2002/0034685 A1 | 3/2002 | Sato et al. |
| 2003/0029495 A1 * | 2/2003 | Mazur et al. ................. 136/256 |
| 2004/0092395 A1 * | 5/2004 | Hase et al. ................... 502/439 |

(Continued)

FOREIGN PATENT DOCUMENTS

CA  02388711 A1  5/2001
JP  2002/042791 A  2/2002

(Continued)

OTHER PUBLICATIONS

Bhushan, Springer Handbook of Nanotechnology, 2nd Edition, Springer, (Nov. 6, 2006).*

(Continued)

*Primary Examiner* — Michael Cleveland
*Assistant Examiner* — Lisha Jiang
(74) *Attorney, Agent, or Firm* — Bryan Cave LLP

(57) ABSTRACT

Methods to manufacture a three-dimensional battery are disclosed and claimed. A structural layer may be provided. A plurality of electrodes may be fabricated, each electrode protruding from the structural layer. A porous dielectric material may be deposited on the plurality of electrodes.

18 Claims, 7 Drawing Sheets

(56) References Cited

U.S. PATENT DOCUMENTS

| | | | |
|---|---|---|---|
| 2004/0163758 A1* | 8/2004 | Kagan et al. | 156/230 |
| 2007/0172732 A1 | 7/2007 | Jung et al. | |
| 2007/0243460 A1 | 10/2007 | Carlson et al. | |
| 2009/0142656 A1 | 6/2009 | Nathan et al. | |
| 2010/0119939 A1 | 5/2010 | Misumi et al. | |

FOREIGN PATENT DOCUMENTS

| | | |
|---|---|---|
| JP | 2008153033 A | 7/2008 |
| JP | 2008153034 A | 7/2008 |
| JP | 2008153035 A | 7/2008 |
| JP | 2008153036 A | 7/2008 |
| WO | 2008072638 A1 | 6/2008 |

OTHER PUBLICATIONS

Köhler et al., Nanotechnology: An Introduction to Nanostructuring Techniques, 1st Edition, Wiley-VCH, (2004).*

Köhler et al., Nanotechnology: An Introduction to Nanostructuring Techniques, 1st Edition, Wiley-VCH, pp. 50-52, (2004).*

Chamran et al., "Three Dimensional Nickel and Zinc Microbatteries", Conference Papers: 19th IEEE International Conference on MEMS, (May 8, 2006), pp. 950-953.*

Long et. al., "Three-Dimensional Battery Architectures," Chemical Reviews, (2004), 104, 4463-4492.

Chang Liu, Foundations of MEMS, Chapter 10, pp. 1-55 (2006).

Kanamura et. al., "Electrophoretic Fabrication of LiCoO2 Positive Electrodes for Rechargeable Lithium Batteries," J. Power Sources, 97-98 (2001) 294-297.

Caballero et al., "LiNi0.5Mn1.5O4 thick-film electrodes prepared by electrophoretic deposition for use in high voltage lithium-ion batteries," J. Power Sources, 156 (2006) 583.

Wang and Cao, "Li+-intercalation Electrochemical/chromic Props of Vanadium Pentoxide Films by Sol Electrophoretic Deposition," Electrochimica Acta, 51, (2006), 4865-4872.

Nishizawa et al., "Template Synth of Polypyrrole-Coated Spinel LiMn2O4 Nanotubules and Props as Cathode Active Materials for Li Batteries," J.Electrochem.Soc., 1923-1927(1997).

Shembel et. al., "Thin Layer Electrolytic Molybdenum Oxysulfides for Li Secondary Batteries With Liquid and Polymer Electrolytes," 5th Adv Batteries and Accumulators (2004).

Kobrin et. al., "Molecular Vapor Deposition—An Improved Vapor-Phase Deposition Technique of Molecular Coatings for MEMS Devices," SEMI Tech Symp:(STS,ISM), 2004.

Green et al., "Structured Silicon Anodes for Li Battery Applications," Electrochem & Solid State Letters, 6, 2003 A75-A79.

Shin et al., "Porous Silicon Negative Electrodes for Rechargeable Lithium Batteries," J. Power Sources, 139 (2005) 314-320.

Broussely and Archdale, "Li-ion batteries and portable power source prospects for the next 5-10 years," J. Power Sources, 136, (2004), 386-394.

V. Lehmann, "The Physics of Macropore Formation in Low Doped n-Type Silicon," J. Electrochem. Soc. 140 (1993), 10, 2836-2843.

Vyatkin et al., "Random and Ordered Macropore Formation in p-Type Silicon," J. Electrochem. Soc. 149, 1, G70-G76 (2002).

van den Meerakker et al., "Etching of Deep Macropores in 6 in. Si Wafers," J. Electrochem. Soc. 147, 7, 2757-2761 (2000).

P.G. Balakrishnan, R. Ramesh, and T. Prem Kumar, "Safety mechanisms in lithium-ion batteries," Journal of Power Sources, 2006, 155, 401-414.

P. Arora and Z. Zhang, "Battery separators," Chem. Rev., 2004, 104, 4419-4462.

International Search Authority, PCT International Search Report and Notification of Transmittal, Int'L App. No. PCT/US 08/50942, May 18, 2008.

Chan, High-performance lithium battery anodes using silicon nanowires, Nature Nanotechnology, vol. 3, pp. 31-35, Jan. 2008.

SERPO, A tenfold improvement in battery life?, ZDNet News, Jan. 15, 2008.

Min et al., Fabrication and properties of a carbon/polypyrrole three-dimensional microbattery, Journal of Power Sources, 2008, 795-800, 178.

Fergus, J.W., Ceramic and polymeric solid electrolytes for lithium-ion batteries, Journal of Power Sources, 2010, 4554-4569, 195.

Teixidor et al., Fabrication and characterization of three-dimensional carbon electrodes for lithium-ion batteries, Journal of Power Sources, 2008, 730-740, 183.

* cited by examiner

METHOD TO FABRICATE A THREE DIMENSIONAL BATTERY WITH A POROUS DIELECTRIC SEPARATOR

CROSS-REFERENCE TO RELATED APPLICATIONS

This application claims priority under 35 U.S.C. section 119(e) to U.S. Provisional Application No. 60/884,846, entitled "Three-Dimensional Lithium Battery Separator Architectures," filed on Jan. 12, 2007, and to U.S. Provisional Application No. 60/884,828, entitled "Three-Dimensional Batteries and Methods of Manufacturing Using Backbone Structure," filed on Jan. 12, 2007, both of which are hereby incorporated by reference herein in their entirety.

FIELD OF THE INVENTION

The present invention relates generally to the field of battery technology, and more particularly to separators for lithium batteries.

BACKGROUND

Lithium batteries are the preferred energy source in various applications due to their energy density, power, and shelf life characteristics. Examples of lithium batteries include non-aqueous batteries such as lithium-ion and lithium polymer batteries.

A separator between positive and negative electrodes of a conventional lithium battery constitutes an important component of the battery. Separators for conventional, planar lithium-ion batteries are typically solid micro-porous polyolefin films that are assembled in a sheet form and rolled in the form of a cathode/separator/anode/separator stack. This stack is rolled tightly and inserted into a can, filled with electrolyte, and then sealed. For example, reference to P. Arora and Z. Zhang, "Battery separators," *Chem. Rev.*, 2004, 104, 4419-4462, may help to illustrate the state of the art in battery separators, and is therefore incorporated by reference as non-essential subject matter herein.

Three-dimensional battery architectures (e.g., interdigitated electrode arrays) have been proposed in the literature to provide higher electrode surface area, higher energy and power density, improved battery capacity, and improved active material utilization compared with two-dimensional architectures (e.g., flat and spiral laminates). For example, reference to Long et. al., "Three-dimensional battery architectures," *Chemical Reviews*, 2004, 104, 4463-4492, may help to illustrate the state of the art in proposed three-dimensional battery architectures, and is therefore incorporated by reference as non-essential subject matter herein. FIG. 1 shows a schematic representation of a cross-section of one example of a three-dimensional battery that has been proposed in the literature. The battery includes a cathode current collector 10 from which cathodes 11 extend into a height direction at various points. A similar structure is made with an anode current collector 14 and anodes 13. The regions between the cathodes 11 and the anodes 13 (and some areas of the current collectors 10 and 14) include electrolyte 12.

The cathodes 11 and anodes 13 may be assembled in various three-dimensional configurations. This can include, for example, inter-digitated pillars or plates where the anodes 13 and the cathodes 11 are in proximity to each other in more than one direction. For example, in FIG. 1, each anode 13 is in close proximity to two cathodes 11, one on either side. In structures such as pillars, each electrode could be in proximity to surfaces from more than 2 counter electrodes. The anode and cathode current collectors 10 and 14 can be separate (top and bottom connection as shown in FIG. 1) or co-planar.

An improved method for incorporating a separator in a three-dimensional lithium battery is desirable in the art.

SUMMARY

Methods to manufacture a three-dimensional battery are disclosed and claimed. A structural layer may be provided. A plurality of electrodes may be fabricated, each electrode protruding from the structural layer. A porous dielectric material may be deposited on the plurality of electrodes. Other aspects and advantages of the present invention can be seen upon review of the figures, the detailed description, and the claims that follow.

DETAILED DESCRIPTION

Existing energy storage devices, such as batteries, fuel cells, and electrochemical capacitors, typically have two-dimensional laminar architectures (e.g., planar or spiral-wound laminates) with a surface area of each laminate being roughly equal to its geometrical footprint (ignoring porosity and surface roughness). A three-dimensional energy storage device can be one in which an anode, a cathode, and/or a separator are non-laminar in nature. For example, if electrodes protrude sufficiently from a backplane to form a non-laminar active battery component, then the surface area for such a non-laminar component may be greater than twice the geometrical footprint of its backplane. In some instances, given mutually orthogonal X, Y, Z directions, a separation between two constant-Z backplanes should be at least greater than a spacing between electrodes in an X-Y plane, divided by the square root of two.

Figure 1:
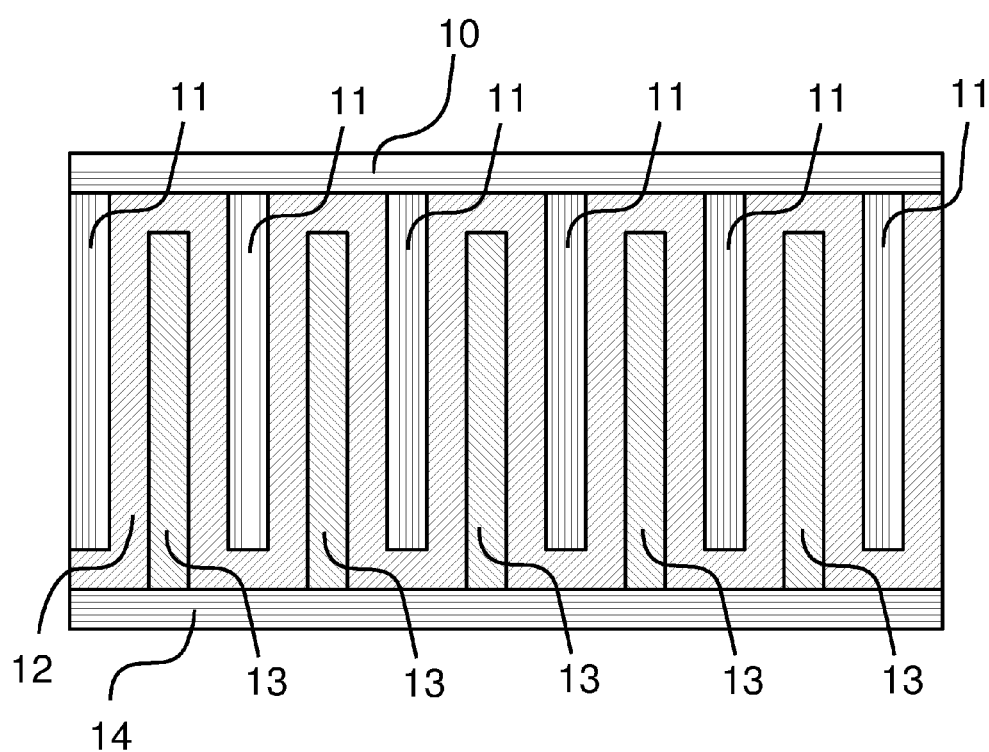
FIG. 1 is a schematic illustration of a cross-section of one example of a three-dimensional lithium-ion battery that has been proposed in the literature.
Figure 2A:
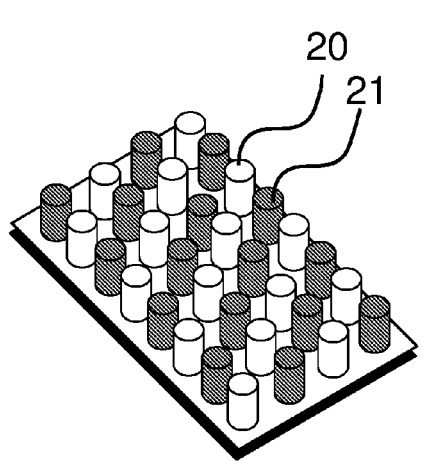
FIG. 2A-2D are schematic illustrations of some three-dimensional energy storage system architectures that may be used in conjunction with certain embodiments of the present invention.
Figure 2B:
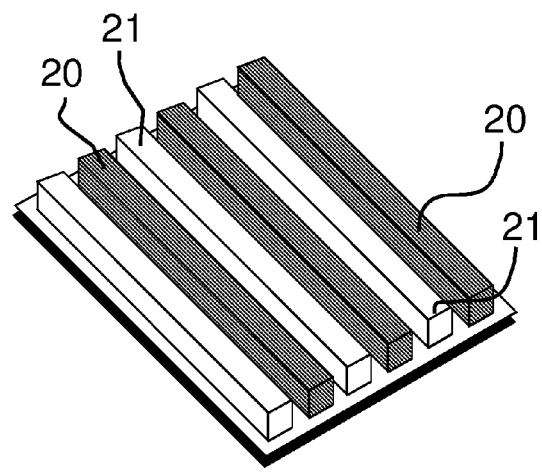
Figure 2C:
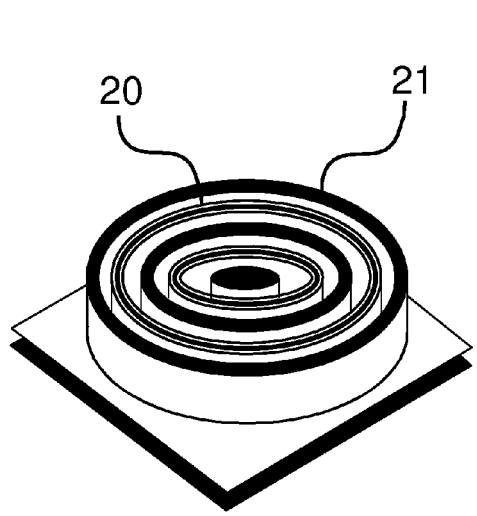
Figure 2D:
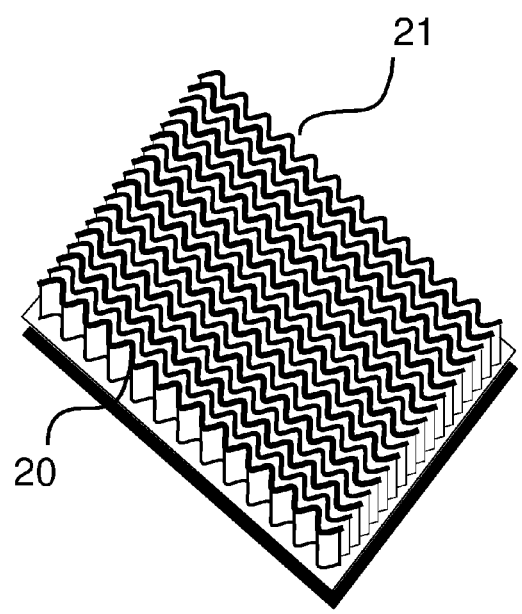

Some examples of three-dimensional architectures that are capable of use with certain embodiments of the present invention, and that have cathodes and anodes protruding from the same backplane, are shown in FIGS. 2A-D. FIG. 2A shows a three-dimensional interdigitated array of lithium ion insertion electrodes in the shape of pillars, FIG. 2B shows a three dimensional assembly with cathodes and anodes in the shape of plates (e.g., a plurality of fins protruding at least 50 microns from a structural layer), FIG. 2C shows a three-dimensional assembly with cathodes and anodes in the shape of concentric circles, and FIG. 2D shows a three-dimensional assembly with cathodes and anodes in the shape of waves. Other configurations, such as honeycomb structures and spirals might also be used with certain embodiments of the present invention. In FIGS. 2A-D, cathodes 20 and anodes 21 protrude from the same backplane and are alternating in a periodic fashion. However, in other embodiments the cathodes 20 may protrude from a different backplane than anodes 21.

The three-dimensional architecture may be fabricated by depositing a conductive material on to an inactive backbone structure, for example in the shape of a plurality of fins, and electrophoretic deposition of electrode material on to the conductive material to create a plurality of anodes and/or cathodes. The backbone structure may be optionally removed as part of or at the conclusion of the fabrication process, for example by etching. Alternatively, or in conjunction with this technique, a structural layer may be provided and then a plurality of protrusions can be formed that protrude from the structural layer. Each of the protrusions may include or may be provided with an electrically conductive surface, and an electrode layer may be deposited on the plurality of protrusions.

Figure 3:
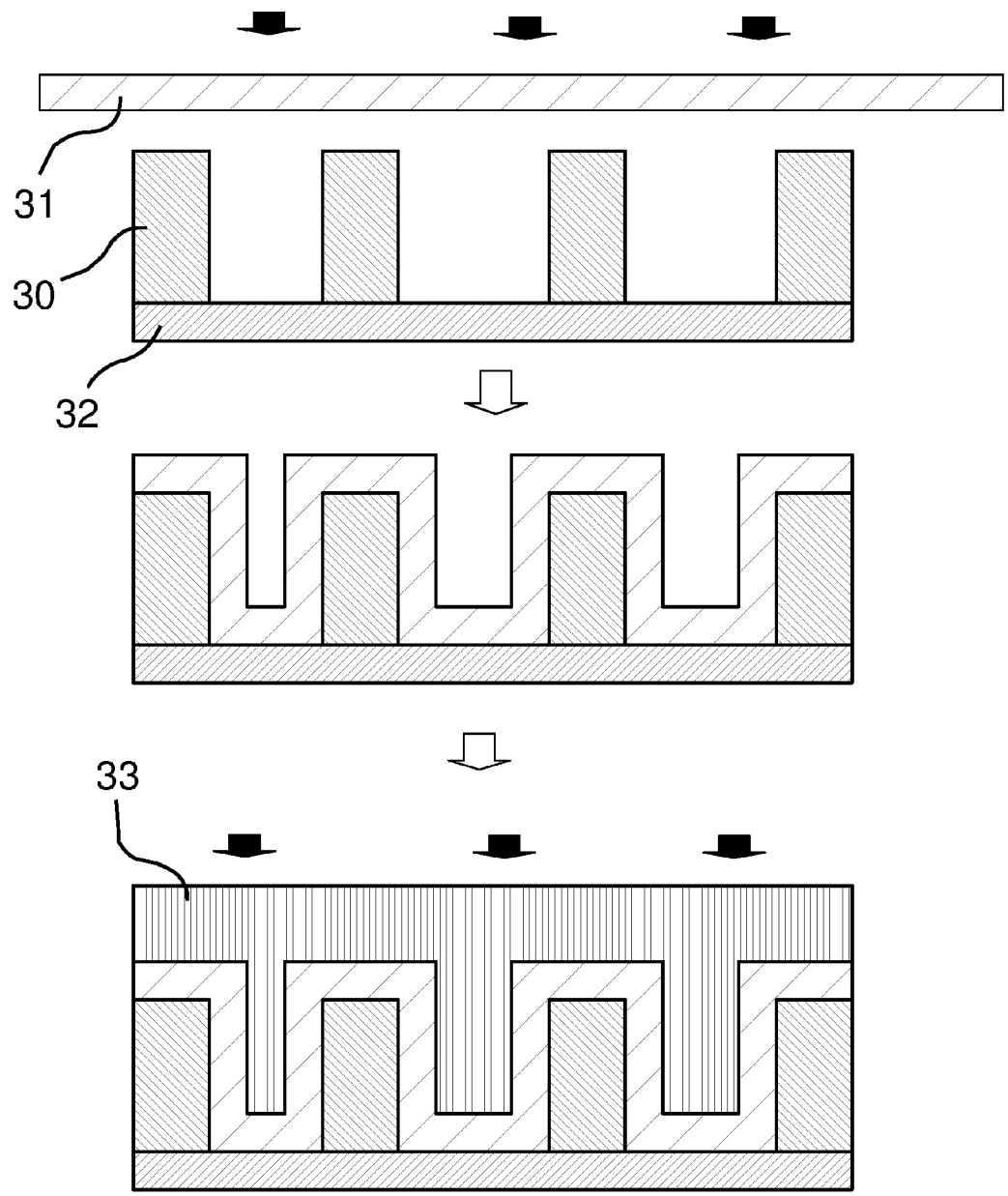
FIG. 3 is a representation of a process for incorporating a separator in a three-dimensional battery using a solid film sub-ambient pressure/suction process, according to an embodiment of the invention.

FIG. 3 shows an example of a method for adding a separator 31 to a three-dimensional architecture. In this case, a current collector 32, which either serves as a structural layer itself or which is deposited upon a structural layer that is not shown, has a plurality of anodes 30 fabricated upon it, for example by photolithographic patterning followed by vacuum deposition, so that the anodes 30 protrude from the current collector 32. A sheet of the separator 31 comprising a porous dielectric material is laid on top of the anodes 30, and this assembly is placed or kept in a sub-ambient pressure chamber. A pressure level within the chamber is then reduced sufficiently below ambient pressure to cause the separator 31 to conformally coat the anodes 30. At this point, this assembly can be removed from the sub-ambient pressure chamber, and cathodes 33 can be assembled or deposited on top in order to make a three-dimensional battery. In another embodiment, various components can all be loaded after mechanical alignment into the sub-ambient pressure chamber in order to assemble the battery.

Materials that can be used as the porous dielectric material for a separator in a three-dimensional architecture according to an embodiment of the present invention may include, without limitation, organic materials such as polypropylenes, polyethylenes, polyamides, polytetraflouroethylenes, polyvinylidine fluorides, polyvinylchlorides, polyimides, polycarbonates, and cellulosics, and inorganic materials such as aluminum oxide, titanium dioxide, silicon dioxide, and zirconium dioxide. The materials that may be used as separators for aqueous and non-aqueous energy storage systems may include spin-on dielectrics. For example, a spin-on glass dielectric can be used as porous barriers between a cathode and an anode in a battery. Some examples are phosphosilicates, MSQ (Methyl-Silsesquioxane), SiLK™, and the like. Many of these materials can be spun on and subsequently cured to form a consistent porous film.

Figure 4:
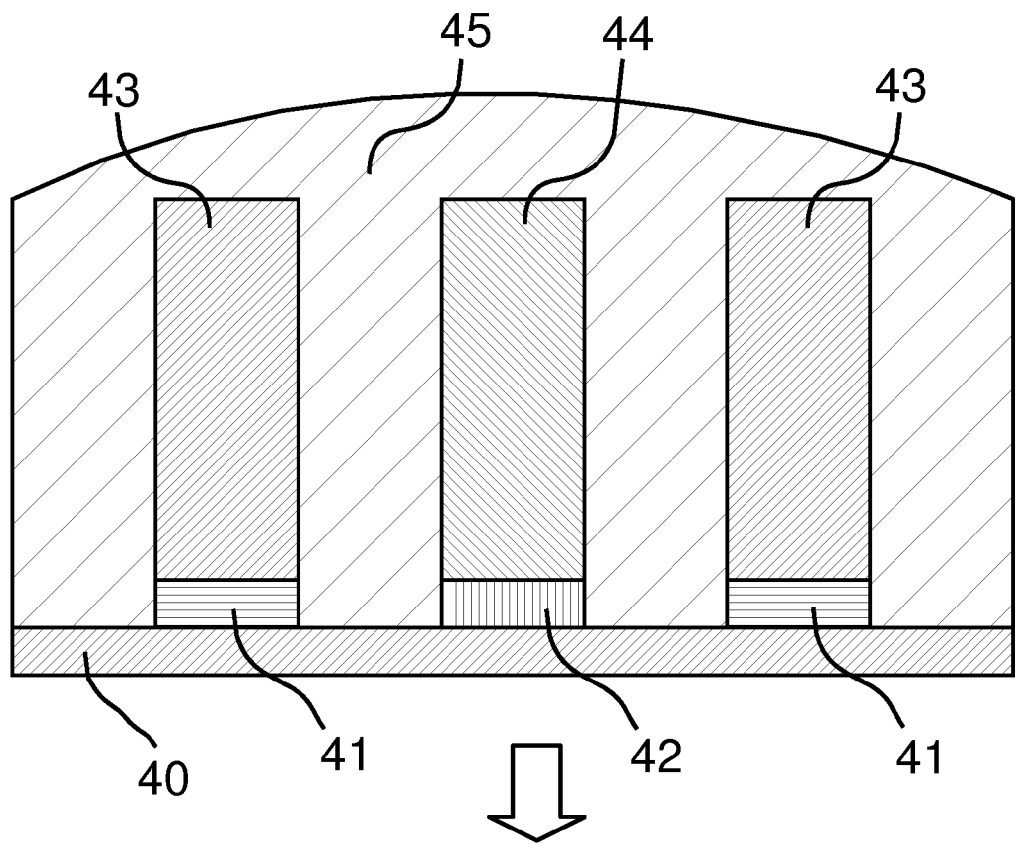
FIG. 4 is a schematic of a process to use a spin-on dielectric for its use as a separator in a three-dimensional battery, according to an embodiment of the invention.
Figure 4:
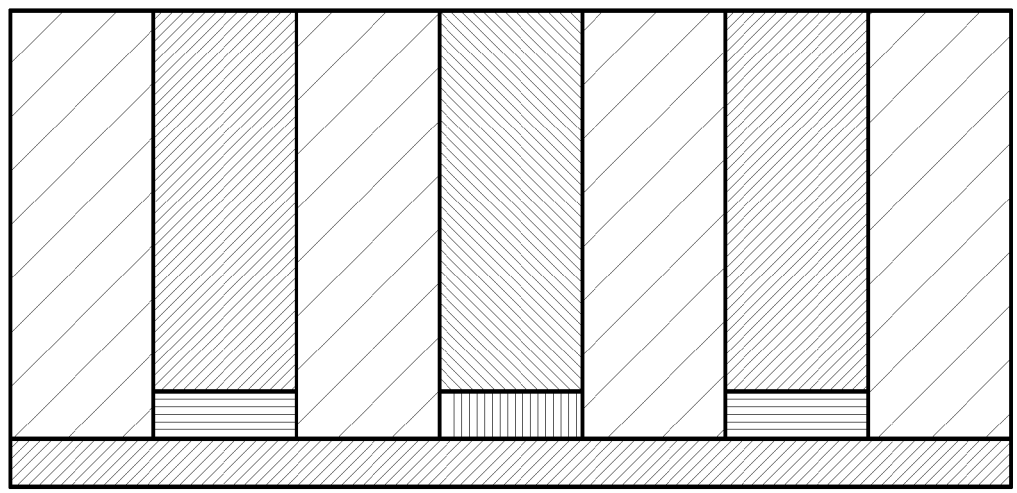

FIG. 4 shows an example of processing a spin-on dielectric on a three-dimensional battery. A substrate 40 has anode current collectors 41 and cathode current collectors 42, on top of which anodes 43 and cathodes 44 sit, respectively. This assembly is then subjected to spin coating of a spin-on glass dielectric 45 and is at least partially planarized by spinning at a suitable rate to provide planar films. Further planarization may be accomplished by a suitable method such as chemical-mechanical polishing (CMP). A resulting porosity can then be obtained on the dielectric 45 by thermal or light-assisted curing. Alternatively, or in conjunction, a spin-on glass can be initially molded into a desired shape and pitch using a sacrificial mold. After setting the spin-on glass, the mold can be removed using a standard mold removal technique. The anodes 43 and the cathodes 44 can subsequently be assembled into a grid of the resulting separator. The separator resulting from this method may have reduced mechanical stress relative to other methods, potentially leading to a more reliable battery.

Figure 5:
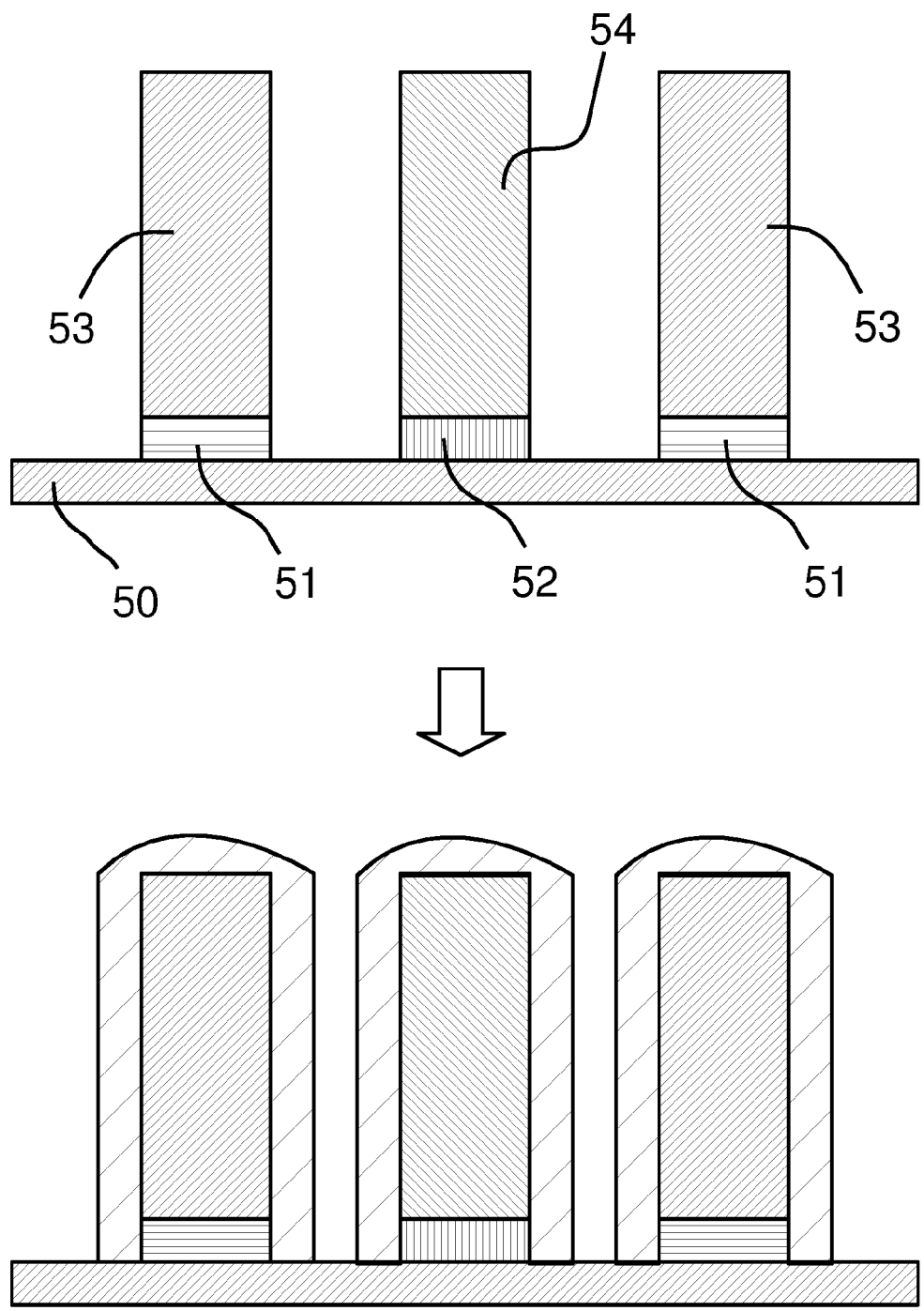
FIG. 5 is a schematic of a separator deposition process using electrophoretic deposition, according to an embodiment of the invention.

Another method that can be used for forming separators is electrophoretic deposition of separator materials. Electrophoretic deposition is typically a potential-driven phenomenon, where particles of non-conducting or poorly conducting materials are driven to either a cathode or an anode by an applied voltage. Thick films can be deposited by this technique. Also, the films can be tailored to different porosities by adding different amounts of sacrificial binders that can be co-deposited electrophoretically and subsequently driven off by temperature. Due to surface effects, the deposition is typically self-limiting. Therefore, a thickness and an available separator spacing can be optimized in order to get full coverage between the cathode and the anode. This process is schematically shown in FIG. 5. In particular, a substrate 50 has anode current collectors 51 and cathode current collectors 52, on top of which anodes 53 and cathodes 54 sit, respectively. This assembly is then immersed in an electrophoretic deposition bath that has a separator material and a desired concentration of a binder for providing porosity. The electrophoretic deposition is carried out by changing the potential of the anodes and/or cathodes using high-voltage DC power supply with a voltage preferably in the range of 1-1500 V, and most preferably in the range of about 10-150 V. The separator resulting from this method may have reduced mechanical stress relative to other methods, potentially leading to a more reliable battery.

Figure 6:
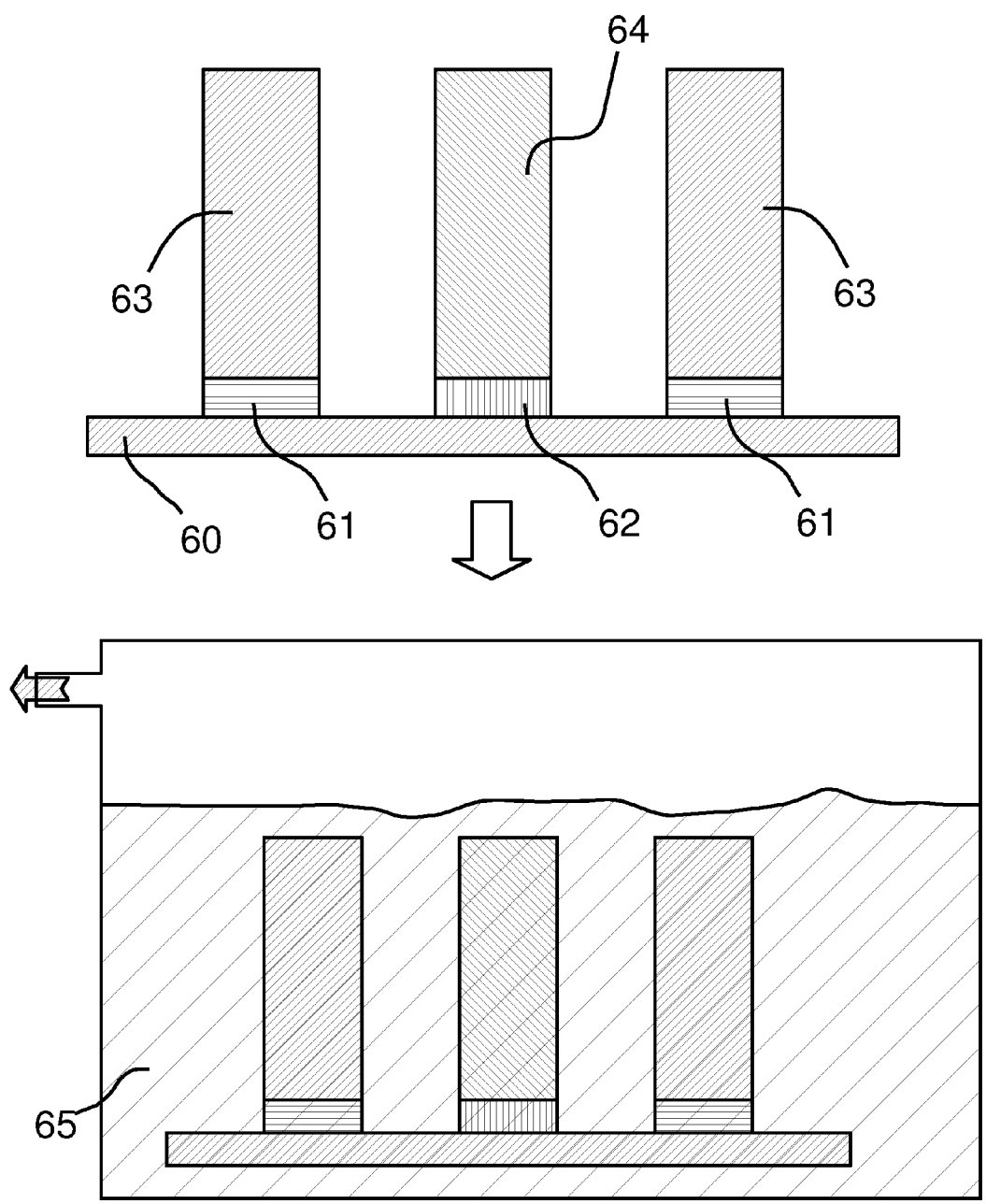
FIG. 6 is a graphical representation of a separator deposition process using an immersion/sub-ambient pressure technique, according to an embodiment of the invention.

Yet another way to deposit separator materials is to use a liquid solution of polyolefins or any other separator material of interest that can be made into a liquefied form in temperatures less than about 100° C. An assembly including electrodes can be immersed into a solution containing the liquefied separator material and a solvent, and a sub-ambient pressure atmosphere can be established around the assembly (e.g., via evacuation from the top of a chamber) in order to fill up crevices with the liquefied material. Once the sub-ambient pressure has been sufficiently established, the solution can wick into the crevices and can displace air in the crevices. In addition, when ambient pressure is restored, any residual bubbles that are present can expand sufficiently so that they will be forced out to be displaced by the liquefied material. The solvent is evaporated or allowed to evaporate with the dielectric material remaining on the plurality of electrodes. An exemplary schematic of this process is shown in FIG. 6. In particular, a substrate 60 has anode current collectors 61 and cathode current collectors 62, on top of which anodes 63 and cathodes 64 sit, respectively. This assembly is then immersed in a solution 65 containing a liquefied material and the solvent, as depicted in the bottom portion of FIG. 6. The separator resulting from this method may have reduced mechanical stress relative to other methods, potentially leading to a more reliable battery.

Figure 7:
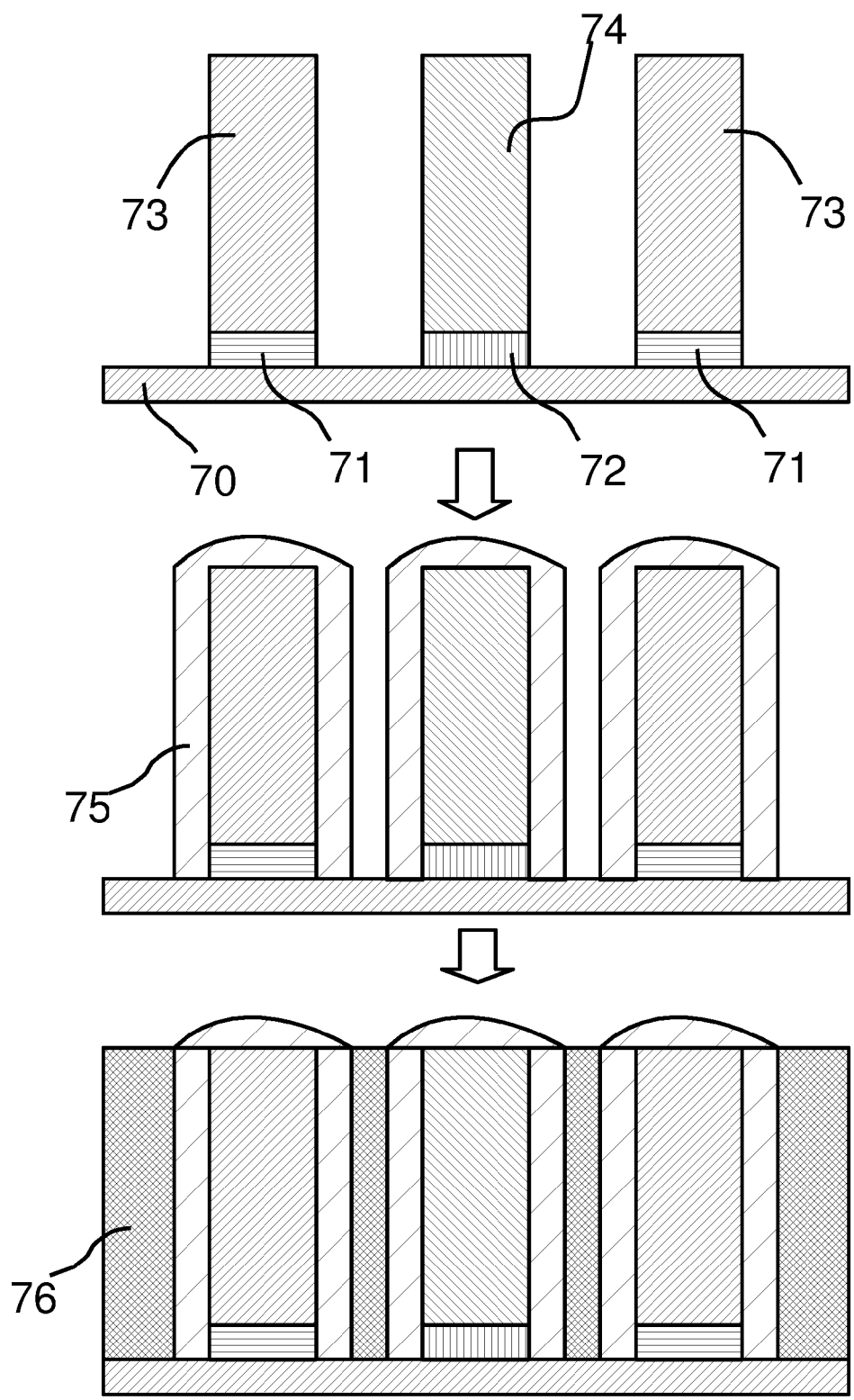
FIG. 7 illustrates a bi-layer deposition method to incorporate a separator in a three-dimensional battery, first using chemical vapor deposition and then using a dip coating, according to an embodiment of the invention.

FIG. 7 shows a two-operation process for deposition of a separator material. In particular, a substrate 70 has anode current collectors 71 and cathode current collectors 72, on top of which anodes 73 and cathodes 74 sit, respectively. The first operation, as shown in the middle portion of FIG. 7, is a chemical vapor deposition process, which adds thin layers of a porous material 75 around the exposed electrodes 73 and 74. This material 75 is then solidified by drying, and the assembly then gets a second coating of the same or a different material 76 by spin-on methods or one of the other methods of deposition described herein, as shown in the bottom portion of FIG. 7. Thus, more than one layer of porous dielectric material may be deposited to fabricate the separator in a three-dimensional architecture.

Likewise, a sheet separator incorporated into a three-dimensional battery according to an embodiment of the present invention need not be formed from a single sheet of material. When the separator is formed from a single sheet of material that is mechanically compressed in order to make a battery, a defect may be magnified during mechanical compression. On the other hand, in three-dimensional structures as shown in FIGS. 4-7, two coincident defects would have to be substantially proximate in the deposited separator in order to have electrical shorts. This feature reduces a probability of separator-related shorting defects in a battery. Similarly, for the exemplary separator shown in FIG. 7, more than two (e.g., three or four) defects would have to be substantially proximate for electrical shorts to occur, which reduces the probability even further.

While the invention has been described with reference to the specific exemplary embodiments thereof, it should be understood by those skilled in the art that various changes may be made and equivalents may be substituted without departing from the true spirit and scope of the invention as defined by the appended claims. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A method to manufacture a three-dimensional battery, comprising:
    providing a structural layer;
    fabricating a plurality of electrodes each protruding from the structural layer, the plurality of electrodes comprising anodes and cathodes; and
    electrophoretically co-depositing a dielectric material and a binder on the plurality of electrodes by applying a voltage to the plurality of electrodes and changing the potential of the anodes and/or the cathodes to drive particles of a non-conducting or poorly conducting material to the anodes and the cathodes to form a porous separator material between the anodes and the cathodes.

2. The method of claim 1 wherein a DC voltage in the range of 10V to 150V is applied to the plurality of electrodes.

3. The method of claim 1 wherein fabricating the plurality of electrodes comprises fabricating an interdigitated array of lithium ion insertion electrodes.

4. The method of claim 3 wherein the plurality of electrodes protrude at least 50 microns from the structural layer.

5. The method of claim 3 wherein electrophoretically depositing a porous dielectric material comprises depositing a plurality of layers of porous dielectric material.

6. The method of claim 1 wherein the electrophoretic deposition is carried out by changing the potential of the anodes and/or cathodes and applying a voltage in the range of 1-1500 V.

7. The method of claim 6 wherein the applied voltage is in the range of 10-150 V.

8. The method of claim 1 wherein the method further comprises thermally treating the electrophoretically co-deposited material to drive-off the binder to tailor the porosity of the porous separator material.

9. The method of claim 1 wherein the electrophoretically co-deposited material provides full coverage of the porous separator material between the anodes and the cathodes.

10. The method of claim 1 wherein the plurality of electrodes protrude at least 50 microns from the structural layer.

11. The method of claim 1 wherein the porous dielectric material is selected from the group of organic materials consisting of polypropylenes, polyethylenes, polyamides, polytetrafluoroethylenes, polyvinylidine fluorides, polyvinylchlorides, polyimides, polycarbonates, and cellulosics.

12. The method of claim 1 wherein the porous dielectric material is selected from the group of inorganic materials consisting of aluminum oxide, titanium oxide, silicon dioxide, and zirconium dioxide.

13. The method of claim 1 wherein depositing a porous dielectric material comprises depositing more than one layer of porous dielectric material.

14. The method of claim 1 wherein the electrode material of each of the plurality of electrodes is discontinuous with the electrode material of others of the plurality of electrodes.

15. A method to manufacture a three-dimensional battery, comprising
    providing a structural layer;
    forming a plurality of non-active backbone structures that protrude from the structural layer;
    depositing an electrically conductive layer on the plurality of non-active backbone structures;
    fabricating a plurality of electrodes including depositing an electrode layer on the plurality of protrusions;
    depositing a porous dielectric material on the plurality of electrodes; and
    removing each of the plurality of non-active backbone structures.

16. The method of claim 15 wherein the removing comprises etching.

17. The method of claim 15 wherein depositing a porous dielectric material comprises depositing a plurality of layers of porous dielectric material.

18. The method of claim 15 wherein the electrode material of each of the plurality of electrodes is discontinuous with the electrode material of others of the plurality of electrodes.

* * * * *